US010585689B1

(12) United States Patent
Marion (10) Patent No.: US 10,585,689 B1
(45) Date of Patent: Mar. 10, 2020

(54) SHARED MEMORY INTERFACE FOR APPLICATION PROCESSES

(71) Applicant: Cisco Technology, Inc., San Jose, CA (US)

(72) Inventor: Damjan Marion, Rijeka (HR)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 15/848,713

(22) Filed: Dec. 20, 2017

(51) Int. Cl.
*G06F 9/46* (2006.01)
*G06F 9/455* (2018.01)
*G06F 9/50* (2006.01)
*G06F 13/362* (2006.01)
*G06F 9/54* (2006.01)

(52) U.S. Cl.
CPC ...... *G06F 9/45545* (2013.01); *G06F 9/45558* (2013.01); *G06F 9/5027* (2013.01); *G06F 9/545* (2013.01); *G06F 13/362* (2013.01); *G06F 2009/45579* (2013.01)

(58) Field of Classification Search
CPC .... G06F 9/45545; G06F 9/545; G06F 13/362; G06F 9/45558; G06F 9/5027; G06F 2009/45579
See application file for complete search history.

(56) References Cited

U.S. PATENT DOCUMENTS

| | | | | |
|---|---|---|---|---|
| 5,617,537 A * | 4/1997 | Yamada | ................... | G06F 15/17 709/201 |
| 5,682,328 A * | 10/1997 | Roeber | ................ | G06F 11/3476 702/187 |
| 5,720,032 A * | 2/1998 | Picazo, Jr. | ............... | H04L 12/44 370/351 |
| 6,256,693 B1 * | 7/2001 | Platko | .................. | G06F 13/4278 710/105 |
| 6,327,615 B1 * | 12/2001 | Kasper | .................... | H04L 49/90 709/213 |
| 6,356,962 B1 * | 3/2002 | Kasper | .................. | G06F 13/128 370/229 |

(Continued)

OTHER PUBLICATIONS

Lin, et al., "memif", https://engineering.purdue.edu/-xzl/xsel/p/memif/memif.html, Purdue University, Last updated Apr. 29, 2016, 3 pgs.

(Continued)

*Primary Examiner* — Adam Lee
(74) *Attorney, Agent, or Firm* — Edell, Shapiro & Finnan, LLC (57) ABSTRACT

A secure shared memory interface for computer application processes is described. In one embodiment, a method includes initiating a shared memory interface between a master application process instance and a slave application process instance running on a computer. The method also includes allocating one or more regions within a memory allocation of the slave application process instance to the shared memory interface. The method further includes generating a first descriptor ring and a second descriptor ring in each region of the one or more regions of the shared memory interface. The master application process instance and the slave application process instance exchange information by adding one or more packets to at least one region of the one or more regions of the shared memory interface.

20 Claims, 9 Drawing Sheets

(56) References Cited

U.S. PATENT DOCUMENTS

| | | | | |
|---|---|---|---|---|
| 6,717,910 | B1* | 4/2004 | Kasper | H04L 47/10 370/229 |
| 6,963,946 | B1* | 11/2005 | Dwork | G06F 13/28 709/213 |
| 7,046,625 | B1* | 5/2006 | Kasper | H04L 49/25 370/230 |
| 7,155,576 | B1* | 12/2006 | Garner | G06F 12/0862 711/137 |
| 7,512,719 | B1* | 3/2009 | Gillespie | G06F 12/0284 710/10 |
| 7,533,154 | B1* | 5/2009 | Chen | H04L 47/6215 709/213 |
| 7,640,346 | B2 | 12/2009 | Ottaviani et al. | |
| 7,689,738 | B1* | 3/2010 | Williams | G06F 13/34 710/52 |
| 7,826,614 | B1* | 11/2010 | Kaniz | H04L 9/0637 380/28 |
| 7,895,298 | B1* | 2/2011 | Murray | G06F 16/40 709/219 |
| 8,122,177 | B1* | 2/2012 | Puranik | G06F 13/28 710/308 |
| 8,711,154 | B2* | 4/2014 | Steinberg | G06F 9/505 345/502 |
| 9,037,754 | B2 | 5/2015 | Talla | |
| 9,071,499 | B2 | 6/2015 | Talla et al. | |
| 9,430,264 | B2 | 8/2016 | Tang et al. | |
| 9,438,488 | B2 | 9/2016 | Joshi et al. | |
| 2002/0013821 | A1* | 1/2002 | Kasper | G06F 5/065 709/213 |
| 2002/0174302 | A1* | 11/2002 | Frank | G06F 12/023 711/130 |
| 2004/0049293 | A1* | 3/2004 | Hadwiger | G06F 13/36 700/4 |
| 2004/0221122 | A1* | 11/2004 | Chen | G06F 12/0284 711/202 |
| 2005/0182908 | A1* | 8/2005 | Kang | G06F 13/1647 711/148 |
| 2005/0213603 | A1* | 9/2005 | Karighattam | H04L 49/90 370/463 |
| 2006/0161704 | A1* | 7/2006 | Nystad | G06F 9/54 710/105 |
| 2007/0074091 | A1* | 3/2007 | Go | G06F 11/1004 714/752 |
| 2008/0056124 | A1* | 3/2008 | Nanda | H04L 29/06 370/229 |
| 2009/0006765 | A1* | 1/2009 | Friedman | H04L 49/90 711/141 |
| 2009/0037550 | A1* | 2/2009 | Mishra | G06F 9/485 709/208 |
| 2009/0089393 | A1* | 4/2009 | Yi | H04L 67/104 709/211 |
| 2009/0180483 | A1* | 7/2009 | Przybylski | G06F 13/4243 370/400 |
| 2011/0119454 | A1* | 5/2011 | Kung | G06F 3/14 711/150 |
| 2011/0197065 | A1* | 8/2011 | Stauth | H04L 63/08 713/170 |
| 2015/0066157 | A1* | 3/2015 | Karypis | G05B 19/0421 700/3 |
| 2015/0127763 | A1* | 5/2015 | Pope | G06F 15/17331 709/212 |
| 2015/0220459 | A1* | 8/2015 | Morita | G06F 13/128 710/110 |
| 2016/0085669 | A1* | 3/2016 | Saidi | G06F 12/1027 711/213 |
| 2017/0187605 | A1* | 6/2017 | Pope | G06F 15/167 |
| 2017/0244715 | A1* | 8/2017 | Menon | H04W 12/06 |
| 2018/0089128 | A1* | 3/2018 | Nicol | G06F 13/4022 |
| 2018/0288106 | A1* | 10/2018 | Ranade | H04N 21/8106 |

OTHER PUBLICATIONS

"Wind River Delivers Breakthrough Performance for Accelerated vSwitch Optimized for NFV", Wind River Systems, Inc., https://www.windriver.com/news/press/pr.html?ID=12801, May 7, 2014, 4 pgs.

Lin, et al., "memif: Towards Programming Heterogeneous Memory Asynchronously", ACM, https://dl.acm.org/citation.cfm?doid=2872362.2872401, Apr. 2-6, 2016, 15 pgs.

"Src/plugins/memif", FD.io VPP: src/plugins/memif, https://docs.fd.io/vpp/17.07/clicmd_src_plugins_memif.html, downloaded from the internet, last accessed Dec. 19, 2017, 1 pg.

"Openvstorage/qemu", qemu/vhost-user.txt at master openvstorage/qemu GitHub, https://github.com/openvstorage/qemu/blob/master/docs/specs/vhost-user.txt, Feb. 15, 2016, 5 pgs.

\* cited by examiner

SHARED MEMORY INTERFACE FOR APPLICATION PROCESSES

TECHNICAL FIELD

This disclosure relates generally to a secure shared memory interface for computer application processes.

BACKGROUND

Virtualization is a technology that allows one computer to do the job of multiple computers by sharing resources of a single computer across multiple systems or processes. Through the use of virtualization, multiple operating systems and applications can run on the same computer at the same time, thereby increasing utilization and flexibility of hardware. Virtualization allows application processes to be decoupled from underlying hardware, thus resulting in multiple virtual machines sharing the same physical hardware. Containers are an operating system level type of virtualization where the operating system kernel is shared between container instances, and each container instance is not visible to other container instances.

Applications and processes running on a shared resource need a secure mechanism for sharing data and information that protects the security of the underlying shared resource.

DESCRIPTION OF EXAMPLE EMBODIMENTS

Overview

Presented herein is a secure shared memory interface for computer application processes. In an example embodiment, a method includes initiating a shared memory interface between a master application process instance and a slave application process instance running on a computer. The method also includes allocating one or more regions to the shared memory interface. The one or more regions are disposed within a memory allocation of the slave application process instance. The method further includes generating a first descriptor ring associated with unidirectional communication from the slave application process instance to the master application process instance in each region of the one or more regions of the shared memory interface, and generating a second descriptor ring associated with unidirectional communication from the master application process instance to the slave application process instance in each region of the one or more regions of the shared memory interface. The master application process instance and the slave application process instance exchange information by adding one or more packets to at least one region of the one or more regions of the shared memory interface.

EXAMPLE EMBODIMENTS

Figure 1:
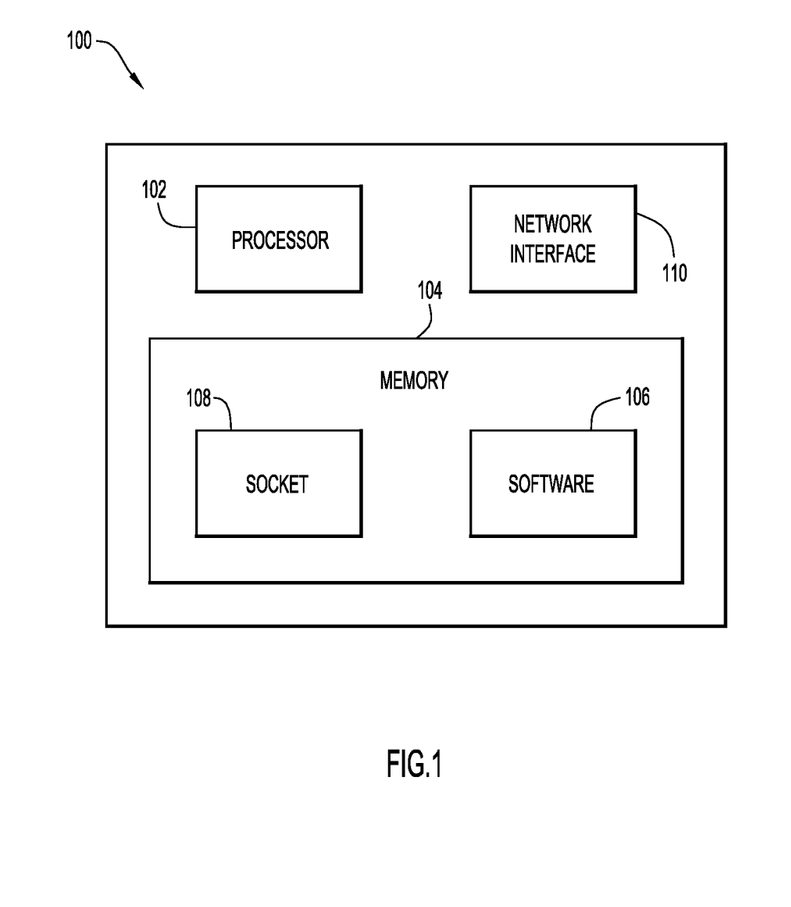
FIG. 1 is a block diagram illustrating a computer in which a shared memory interface may be implemented, according to an example embodiment.

FIG. 1 is a block diagram illustrating a computer 100 in which a shared memory interface may be implemented, according to an example embodiment. In this embodiment, computer 100 may include a processor 102 for processing information, a memory 104, and a bus (not shown) or other communication mechanism coupled with processor 102 for communicating the information between various components of computer 100. While the figure shows a single block 102 for a processor, it should be understood that the processor 102 may represent a plurality of processing cores, each of which can perform separate processing.

The memory 104 may be read only memory (ROM), random access memory (RAM), magnetic disk storage media devices, optical storage media devices, flash memory devices, electrical, optical, or other physical/tangible memory storage devices. Thus, in general, the memory 104 may comprise one or more tangible (non-transitory) computer readable storage media (e.g., a memory device) encoded with software comprising computer executable instructions and when the software is executed (by the processor 102) it is operable to perform the operations described herein. For example, software 106 is stored in memory 104 for providing one or more of the application processes and/or shared memory interface operations described herein. In particular, software 106 may cause computer 100 to perform the operations described in connection with FIGS. 2-9 below when executed by processor 102 from memory 104. In addition, memory 104 may be used for storing temporary variables or other intermediate information during the execution of instructions by processor 102.

Memory 104 may further include instructions that, when executed by the processor 102, perform the functions of at least one socket 108. In an example embodiment, socket 108 may be a data communications endpoint for exchanging data between application processes executing on the same host operating system, i.e., application processes running on computer 100. For example, socket 108 may be a Unix® domain socket or similar type of socket that permits communication between application processes on a shared resource.

Computer 100 may also include a network interface 110. The network interface 110 may be, for example, one or more network interface cards configured to enable network communications. With this arrangement, computer 100 may be capable of communication with one or more other computers or endpoints accessible over a network, including any wired, wireless, or a combination of wired and wireless, local access network or wide area network. The computer 100 may take on a variety of forms, such as a stand-alone computer, server computer, or any device having computing capabilities.

Figure 2:
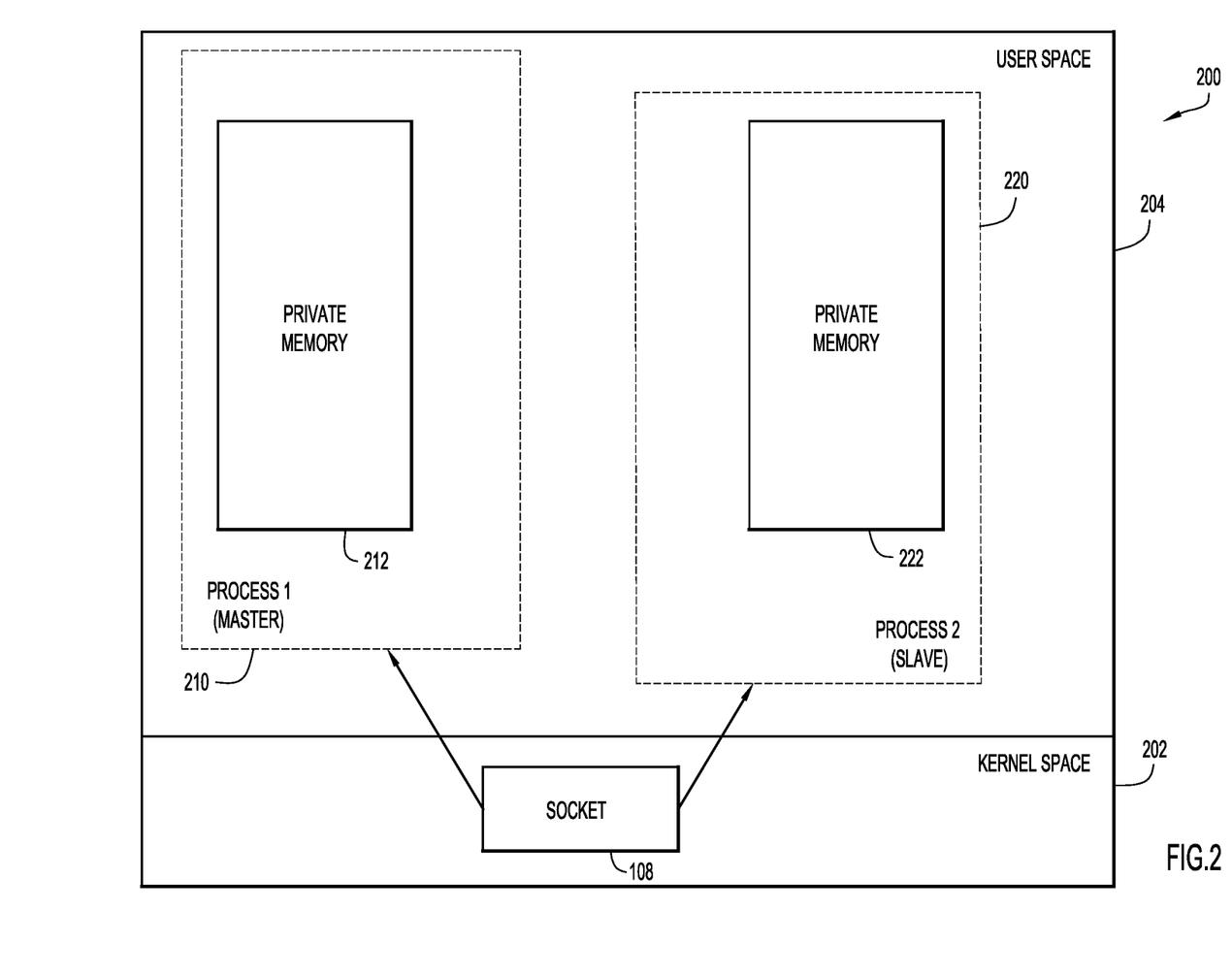
FIG. 2 is a diagram illustrating application process instances running on a computer, according to an example embodiment.

Referring now to FIG. 2, a diagram illustrating two application processes running on computer 100 is shown, according to an example embodiment. In this embodiment, multiple application processes may run within a virtual memory space 200 of computer 100. Virtual memory space 200 may be a memory allocation provided by computer 100 from one or more portions of available memory associated with processor 102 and/or memory 104. In this embodiment, virtual memory space 200 includes a kernel space 202 and a user space 204. Kernel space 202 is the area within virtual memory space 200 that is apportioned for executing the operating system kernel for computer 100, kernel extensions, and a majority of device drivers. In this embodiment, socket 108 is also provided within kernel space 202. User space 204 is the area within virtual memory space 200 that is available for executing application processes. Additionally, user space 204 may also include a shared memory interface according to the principles of the example embodiments, as will be further described below.

As shown in FIG. 2, two application process instances are running in user space 204 —a master application process instance 210 (Process 1) and a slave application process instance 220 (Process 2). In this embodiment, the two application process instances 210, 220 have a master-slave architecture such that master application process instance 210 is considered secure and has unidirectional control over one or more slave application process instances, including slave application process instance 220. Each application process instance includes private memory area allocated exclusively for use by that instance. In this embodiment, master application process instance 210 includes a private memory area 212 and slave application process instance 220 includes a private memory area 222. Communication between master application process instance 210 and slave application process instance 220 may be conducted via socket 108.

Figure 3:
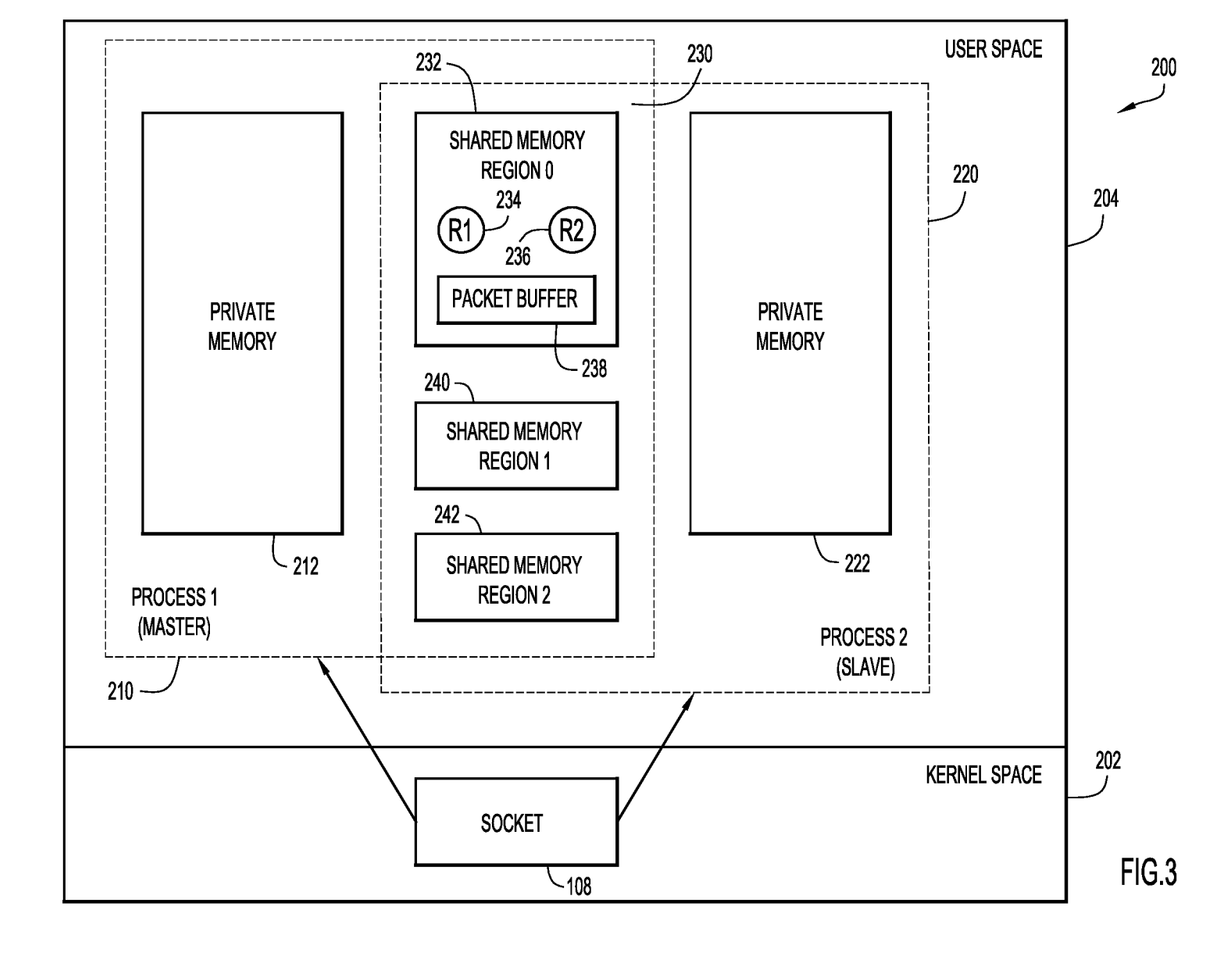
FIG. 3 is a diagram illustrating a shared memory interface between application process instances, according to an example embodiment.

According to the principles of the example embodiments described herein, a secure shared memory interface may be provided to allow for the exchange of information between multiple application process instances. Referring now to FIG. 3, a shared memory interface 230 is provided between master application process instance 210 and slave application process instance 220, according to an example embodiment. In this embodiment, master application process instance 210 is considered secure and does not expose any resources to slave application process instance 220. Accordingly, slave application process instance 220 is responsible for allocating a portion of its available memory space to shared memory interface 230, which may be accessed and used by master application process instance 210. With this arrangement, master application process instance 210 can remain secure from software defects or malicious actions from slave application process instance 220.

As shown in FIG. 3, slave application process instance 220 may allocate a portion of its available memory space to one or more shared memory regions within shared memory interface 230. In this embodiment, shared memory interface 230 includes at least a first shared memory region 232 (Region 0), and may further include additional shared memory regions, for example, a second shared memory region 240 (Region 1) and/or a third shared memory region 242 (Region 2). It should be understood that shared memory interface 230 may contain any number of additional shared memory regions. Each shared memory region may have a substantially similar arrangement as will be described in reference to first shared memory region 232.

In this embodiment, first shared memory region 232 includes a pair of descriptor rings 234, 236 that provide unidirectional communication from one application process instance to the other. A first descriptor ring 234 is associated with unidirectional communication from slave application process instance 220 to master application process instance 210. A second descriptor ring 236 is conversely associated with unidirectional communication from master application process instance 210 to slave application process instance 220. A pair of descriptor rings is the minimum required for the shared memory interface. In other embodiments, more than one descriptor ring may be provided in each direction (e.g., from slave application process instance 220 to master application process instance 210 and from master application process instance 210 to slave application process instance 220). For example, multiple descriptor rings in each direction may be provided where master application process instance 210 and/or slave application process instance 220 are running with multiple threads.

First shared memory region 232 further includes a packet buffer 238. Packet buffer 238 is portion of shared memory region 232 that is provided to store one or more data packets that may be exchanged between master application process instance 210 and slave application process instance 220. Each data packet that is added to packet buffer 238 may be associated with a particular location within packet buffer 238 so that it may be accessed by master application process instance 210 and/or slave application process instance 220. For example, as will be further described below, master application process instance 210 and slave application process instance 220 may exchange information (e.g., data packets) by using first descriptor ring 234 and second descriptor ring 236 to inform the other instance of the location of the information (e.g., a particular data packet) in packet buffer 238 so that it may be accessed by the other.

Figure 4:
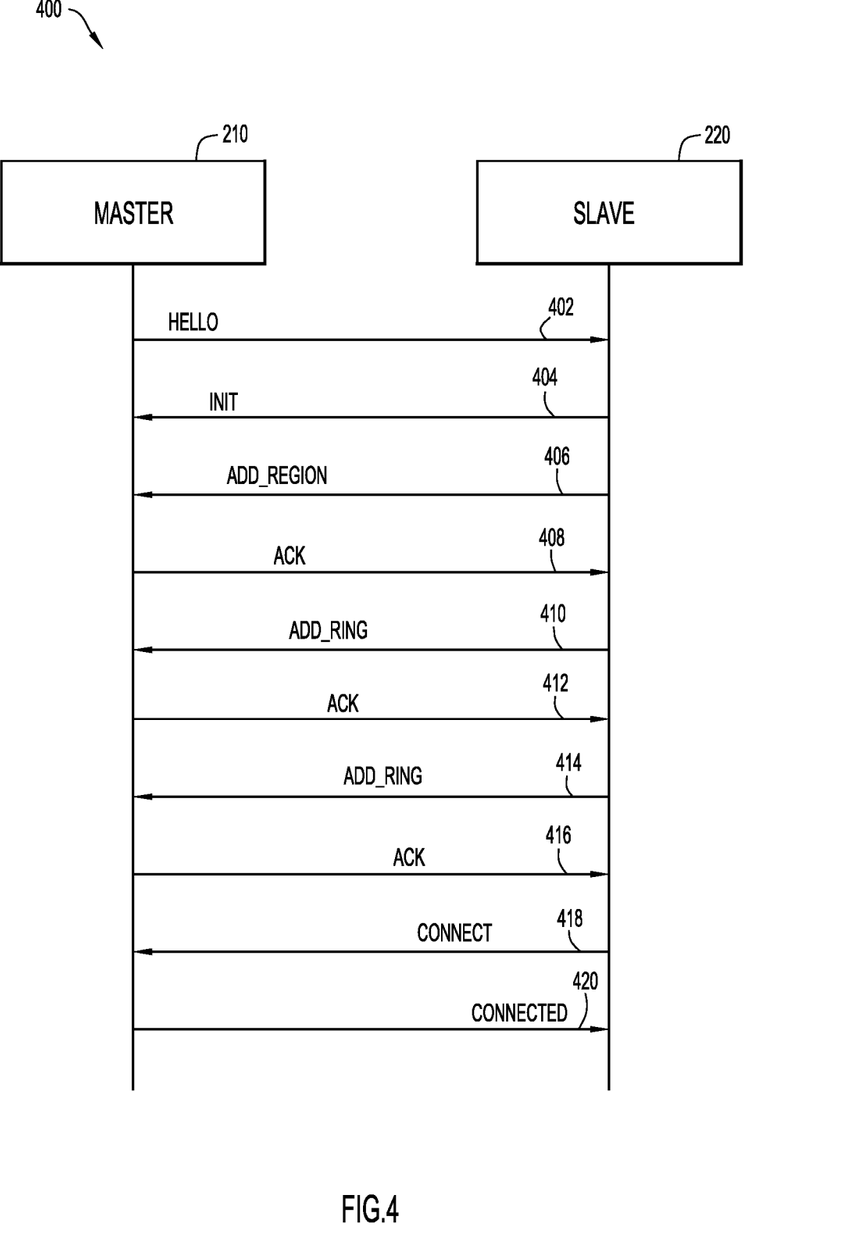
FIG. 4 is a ladder diagram of an authentication process for initializing a secure connection between master and slave application process instances, according to an example embodiment.

Referring now to FIG. 4, a ladder diagram of an authentication process 400 for initializing a secure connection between master application process instance 210 and slave application process instance 220 is shown according to an example embodiment. According to the principles of the embodiments described herein, authentication process 400 may be used to initialize a connection between a master application process instance and a slave application process instance (e.g., between master application process instance 210 and slave application process instance 220) as part of the initiation of the shared memory interface. The initial authentication process 400 is established over the control channel (e.g., via socket 108) using parameter negotiation with a set of defined, fixed size messages.

As shown in FIG. 4, authentication process 400 begins with master application process instance 210 waiting or listening for a connection on socket 108 made by one or more slave application process instances. For example, a specific interface may be uniquely identified using the socket filename and interface identifier. Accordingly, once slave application process instance 220 connects to socket 108, authentication process 400 may start with an operation 402 where master application process instance 210 sends a HELLO message to slave application process instance 220. The HELLO message sent at operation 402 includes information about master application process instance 210 to allow slave application process instance 220 to respond with an INIT message at an operation 404 that begins the shared memory interface initialization. Optionally, authentication process 400 may include a shared secret authentication.

Next, at an operation 406, slave application process instance 220 sends an ADD_REGION message to master application process instance 210 that provides the shared memory region of the shared memory interface to master application process instance 210. For example, slave application process instance 220 can provide first shared memory region 232 of shared memory interface 230 to master application process instance 210 at operation 406. In response, at an operation 408, master application process instance 210 sends an ACK message that acknowledges the receipt of the shared memory region provided at operation 406. In the case of multiple shared memory regions (e.g., second shared memory region 240 and/or third shared memory region 242), slave application process instance 220 sends another ADD_REGION message to master application process instance 210 for each additional shared memory region. Similarly, master application process instance 210 responds with a corresponding ACK message.

At an operation 410, slave application process instance 220 sends an ADD_RING message to master application process instance 210 that provides information associated with one ring of the pair of descriptor rings in the shared memory region established at operation 406 to master application process instance 210. For example, slave application process instance 220 can provide information associated with first descriptor ring 234 of first shared memory region 232 of shared memory interface 230 to master application process instance 210 at operation 410. The information may include size of the rings, offset in the memory region, interrupt eventfd, and/or other relevant information. In response, at an operation 412, master application process instance 210 sends an ACK message that acknowledges the receipt of the descriptor ring information provided at operation 410.

Similarly, at an operation 414, slave application process instance 220 sends another ADD_RING message to master application process instance 210 that provides information associated with the other ring of the pair of descriptor rings in the shared memory region established at operation 406 to master application process instance 210. For example, slave application process instance 220 can provide information associated with second descriptor ring 236 of first shared memory region 232 of shared memory interface 230 to master application process instance 210 at operation 414. At an operation 416, master application process instance 210 sends another ACK message that acknowledges the receipt of the second descriptor ring information provided at operation 414.

In the case of multiple descriptor rings in each direction, slave application process instance 220 sends another ADD_RING message to master application process instance 210 for each additional descriptor ring, and master application process instance 210 responds with a corresponding ACK message.

Once the information associated with the shared memory region and the associated pair of descriptor rings has been provided by slave application process instance 220 to master application process instance 210 at operations 406, 410, and 414, and such information has been acknowledged by master application process instance 210 at operations 408, 412, and 416, the shared memory interface is initialized. Accordingly, slave application process instance 220 may send a CONNECT request to master application process instance 210 at an operation 418 to change the state of the shared memory interface to "connected". At an operation 420, master application process instance 210 sends a CONNECTED message to slave application process instance 220 to notify slave application process instance 220 that the shared memory interface is now "connected".

Upon successful connection of the shared memory interface between master application process instance 210 and slave application process instance 220 at operation 420, authentication process 400 may end.

Figure 5:
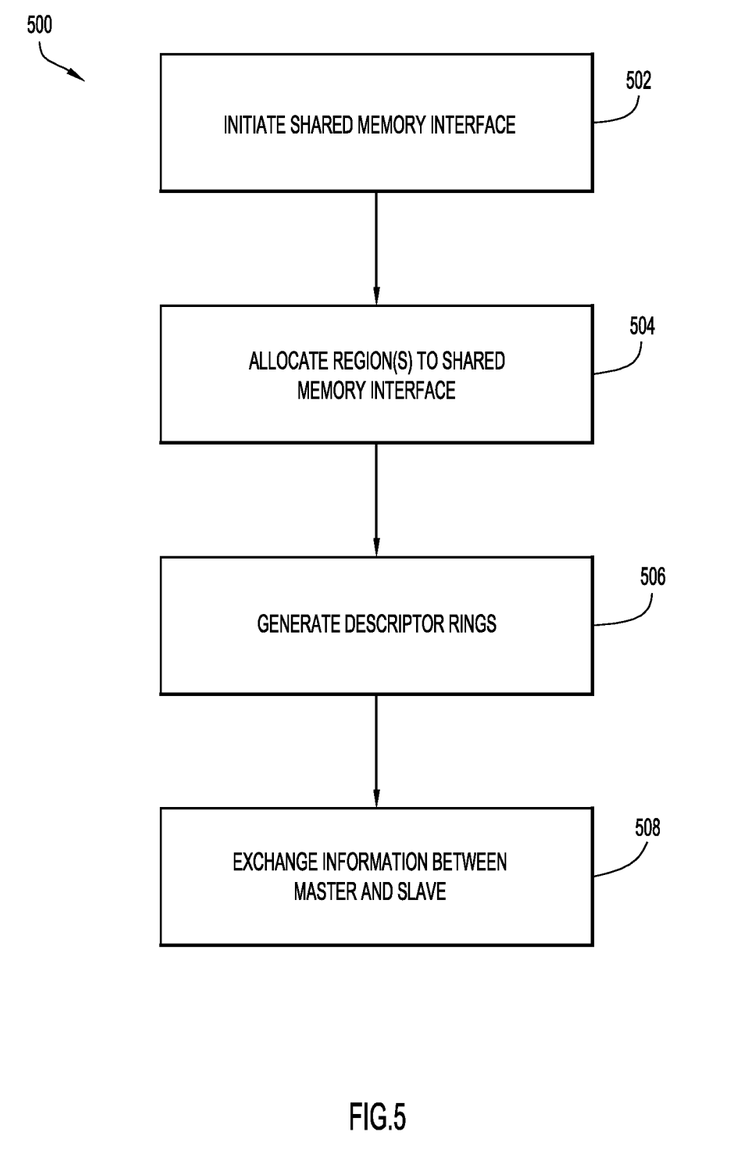
FIG. 5 is a flowchart of a method for implementing a shared memory interface between master and slave application process instances, according to an example embodiment.
Figure 6:
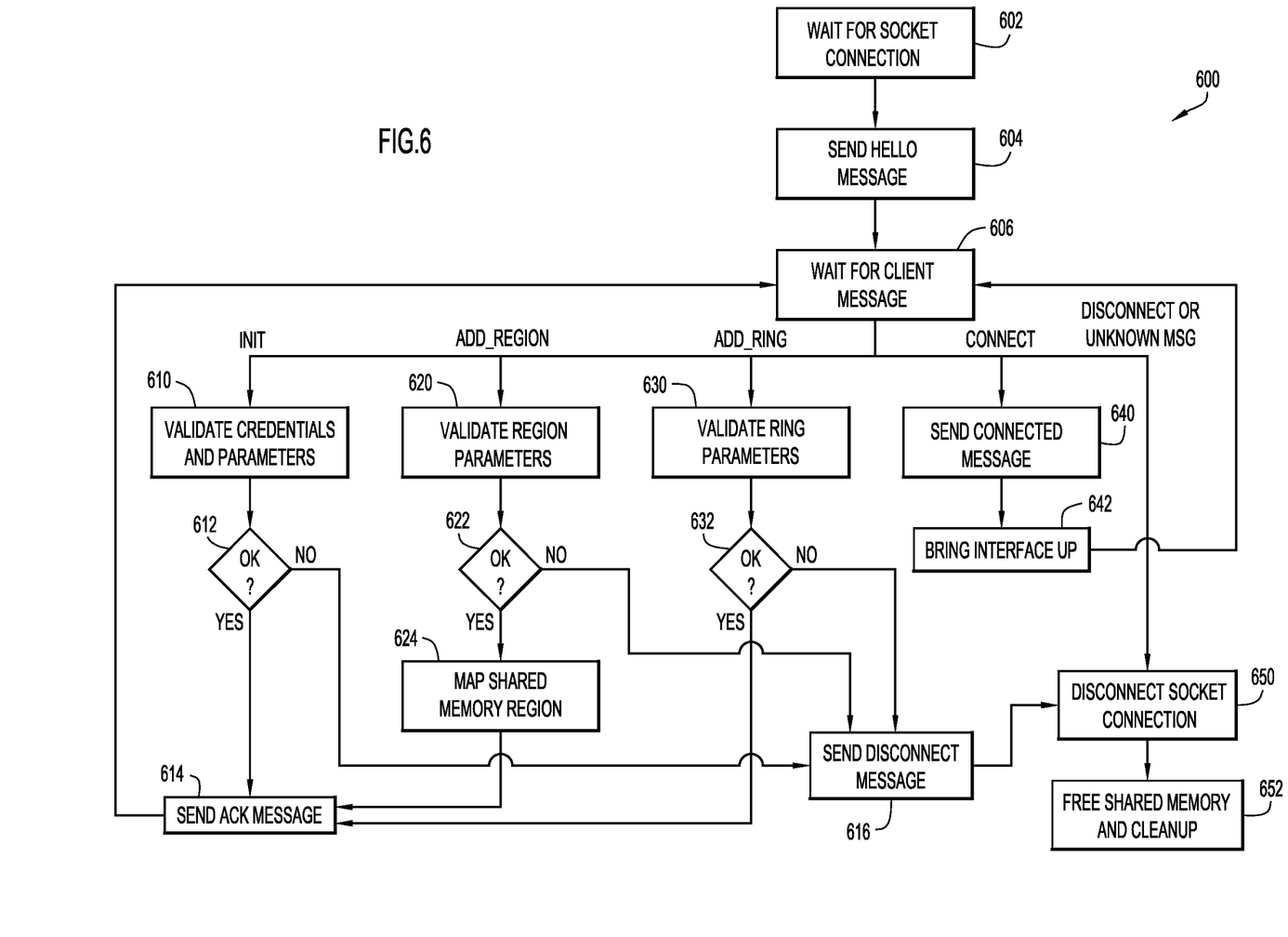
FIG. 6 is a flowchart of a method for implementing a shared memory interface by a master application process instance, according to an example embodiment.
Figure 7:
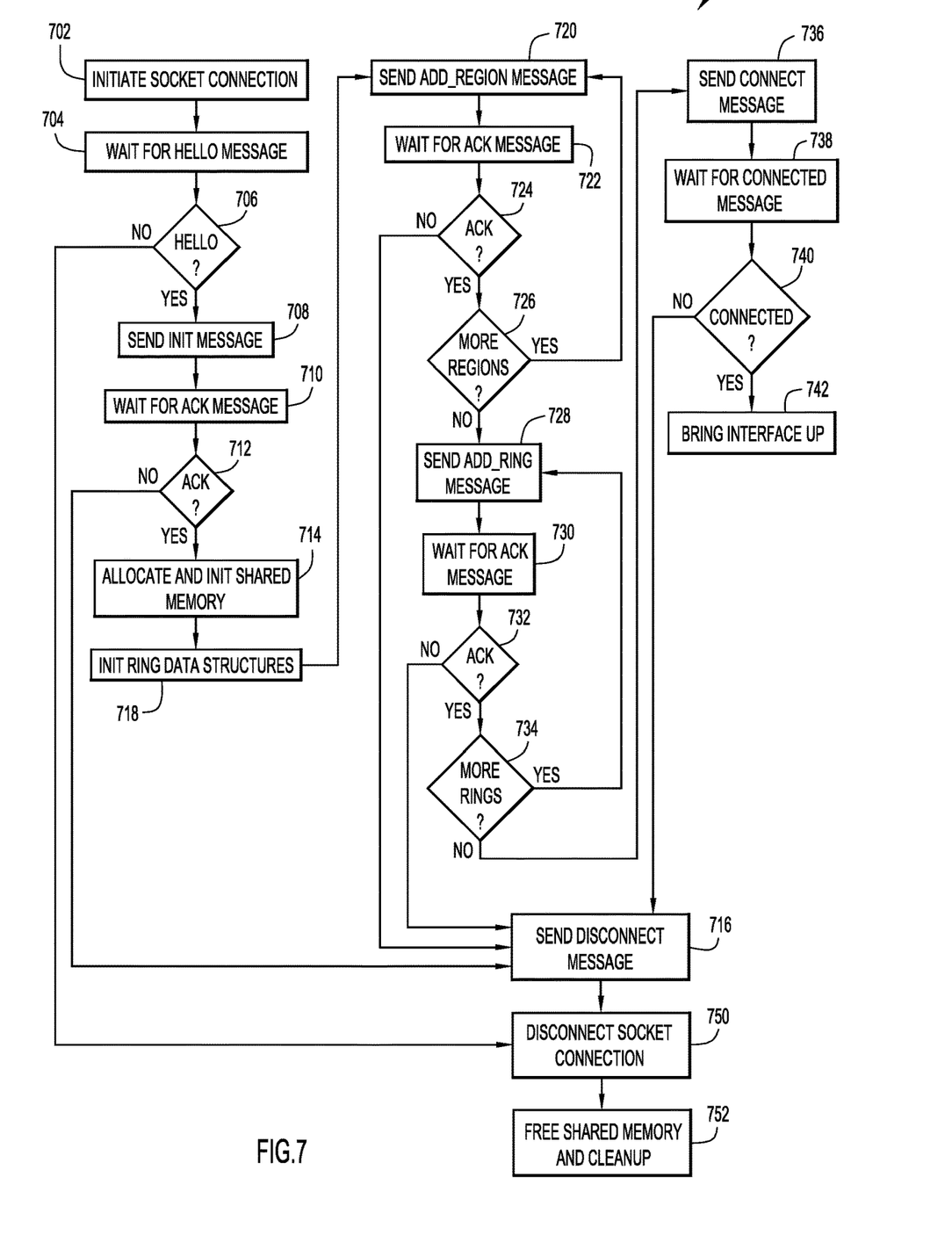
FIG. 7 is a flowchart of a method for implementing a shared memory interface by a slave application process instance, according to an example embodiment.

FIGS. 5-7 illustrate flowcharts of the method of implementing a shared memory interface between master and slave application process instances in general (FIG. 5), as well as from the point of view of the master application process instance (FIG. 6) and the slave application process instance (FIG. 7). Referring now to FIG. 5, a flowchart of a method 500 for implementing a shared memory interface between master application process instance 210 and slave application process instance 220 is shown according to an example embodiment. Further details of the operations of method 500 as implemented by master application process instance 210 and/or slave application process instance 220 will be described in reference to FIGS. 6 and 7 below. In this embodiment, method 500 includes an operation 502 where a shared memory interface is initiated between master application process instance 210 and slave application process instance 220, for example, by establishing a secure connection over socket 108.

Next, method 500 includes an operation 504 where one or more regions of memory associated with slave application process instance 220 are allocated to the shared memory interface. For example, shared memory regions 232, 240, 242 may be allocated to shared memory interface 230 from the available memory of slave application process instance 220.

At an operation 506, a pair of descriptor rings (e.g., descriptor rings 234, 236) are generated for the shared memory interface. As described above, each of the descriptor rings allows unidirectional communication from one application process instance to the other application process instance. For example, first descriptor ring 234 may provide unidirectional communication from slave application process instance 220 to master application process instance 210 and second descriptor ring 236 may provide unidirectional communication from master application process instance 210 to slave application process instance 220.

Next, at an operation 508, master application process instance 210 and slave application process instance 220 may exchange information using the shared memory interface (e.g., shared memory interface 230). For example, exchanging information at operation 508 may include adding one or more data packets to at least one of the shared memory regions (e.g., shared memory regions 232, 240, 242) allocated by slave application process instance 220 to shared memory interface 230.

Referring now to FIG. 6, a flowchart of a method 600 for implementing a shared memory interface by a master application process instance, for example, master application process instance 210, is shown according to an example embodiment.

In this embodiment, method 600 may begin at an operation 602 where master application process instance 210 waits or listens for a socket connection made by a slave application process instance, for example, slave application process instance 220 connecting to socket 108. Upon detection of a socket connection at operation 602, master application process instance 210 sends a HELLO message at an operation 604. As described above with reference to authentication process 400, the HELLO message sent by master application process instance 210 at operation 604 includes information about master application process instance 210. Next, at an operation 606, master application process instance 210 waits to receive a response from slave application process instance 220.

The response received from slave application process instance 220 at operation 606 may include an INIT message, an ADD_REGION message, an ADD_RING message, a CONNECT message, a DISCONNECT message, as well as other unknown messages. Master application process instance 210 follows authentication process 400 described above to establish a secure connection with slave application process instance 220. For example, at an operation 510, upon receiving the INIT message from slave application process instance 220 at operation 606, master application process instance 210 validates the credentials and parameters provided by slave application process instance 220.

At an operation 612, master application process instance 210 determines whether the credentials and parameters received at operation 610 are valid. If they are valid, method 600 proceeds to an operation 614 where master application process instance 210 sends an ACK message to slave application process instance 220 to acknowledge the initialization of authentication process 400. If they are not valid, method 600 proceeds to an operation 616 where master application process instance 210 sends a DISCONNECT message to slave application process instance 220. After sending the DISCONNECT message, master application process instance 210 may also disconnect the socket connection with slave application process instance 220 at an operation 650.

Next, at an operation 620, upon receiving the ADD_REGION message from slave application process instance 220, master application process instance 210 validates the provided region parameters identifying the shared memory region allocated by the slave application process instance 220 to the shared memory interface. At an operation 622, master application process instance 210 determines whether the region parameters received at operation 620 are valid. If they are valid, method 600 proceeds to an operation 624 where master application process instance 210 maps the provided region to the shared memory region, for example, shared memory regions 232, 240, 242, and sends an ACK message at operation 614. If they are not valid, method 600 proceeds to operation 616 where master application process instance 210 sends the DISCONNECT message to slave application process instance 220 and disconnects the socket connection at operation 650.

Next, at an operation 630, upon receiving the ADD_RING message from slave application process instance 220, master application process instance 210 validates the provided ring parameters identifying the descriptor ring generated by slave application process instance 220 in the shared memory interface, for example, first descriptor ring 234 and/or second descriptor ring 236. At an operation 632, master application process instance 210 determines whether the ring parameters received at operation 630 are valid. If they are valid, method 600 proceeds to operation 614 where master application process instance 210 sends the ACK message. If they are not valid, method 600 proceeds to operation 616 where master application process instance 210 sends the DISCONNECT message to slave application process instance 220 and disconnects the socket connection at operation 650.

At an operation 640, master application process instance 210 receives a CONNECT message from slave application process instance 220 and responds with a CONNECTED message to notify slave application process instance 220 that the shared memory interface is now "connected" and authentication process 400 has been successful. At an operation 642, the shared memory interface, for example, shared memory interface 230, may be brought up to allow for the exchange of information between master application process instance 210 and slave application process instance 220. Details of exchanging information between master application process instance 210 and slave application process instance 220 using shared memory interface 230 will be further described in detail below in reference to FIG. 8.

Upon receipt of a DISCONNECT message or an unknown message from slave application process instance 220 at operation 606, master application process instance 210 may disconnect the socket connection at operation 650. Additionally, if the shared memory interface had been established prior to disconnecting the socket connection at operation 650, at an operation 652, master application process instance 210 may also free the shared memory allocation and perform assorted cleanup operations.

Referring now to FIG. 7, a flowchart of a method 700 for implementing a shared memory interface by a slave application process instance, for example, slave application process instance 220, is shown according to an example embodiment.

In this embodiment, method 700 may begin at an operation 702 where slave application process instance 220 initiates a socket connection with a master application process instance, for example, master application process instance 210 via socket 108. At an operation 704, slave application process instance 220 waits to detect a HELLO message sent from master application process instance 210. At an operation 706, slave application process instance 220 determines whether the HELLO message has been received. If it is not received at operation 706, then method 700 may end and the socket connection may be disconnected at an operation 750. If the HELLO message has been received, then method 700 proceeds to an operation 708 where slave application process instance 220 sends an INIT message to master application process instance 210 to begin authentication process 400, described above.

Next, at an operation 710, slave application process instance 220 waits to receive an ACK message from master application process instance 210 acknowledging the INIT message sent at operation 708. If the ACK message is not received at an operation 712, then method 700 may proceed to an operation 716 where a DISCONNNECT message is sent. Upon sending the DISCONNECT message, the socket connection is disconnected at operation 750 and method 700 may end. If the ACK message is received at operation 712, then method 700 may proceed to an operation 714 where slave application process instance 220 initiates and allocates a portion of its available memory to the shared memory interface, for example, shared memory interface 230.

Next, at an operation 718, slave application process instance 220 also initiates the pair of descriptor rings (e.g., descriptor rings 234, 236) for the shared memory interface. At an operation 720, slave application process instance 220 sends an ADD_REGION message to master application process instance 210 to provide the details of the shared memory regions of the shared memory interface to master application process instance 210 (e.g., shared memory regions 232, 240, 242).

At an operation 722, slave application process instance 220 waits to receive an ACK message from master application process instance 210 acknowledging the information associated with the shared memory region sent at operation 720. If the ACK message is not received at an operation 724, then method 700 may proceed to operation 716 where the DISCONNNECT message is sent and the socket connection is disconnected at operation 750. If the ACK message is received at operation 724, then method 700 may proceed to an operation 726 where slave application process instance 220 determines if additional shared memory regions are to be allocated for the shared memory interface. If so, then method 700 returns to operation 720 where the details of the next shared memory region are sent to master application process instance 210 in another ADD_REGION message. If no further shared memory regions are needed, then method 700 proceeds to an operation 728 where details of a descriptor ring (e.g., first descriptor ring 234) are sent to master application process instance 210 in an ADD_RING message.

At an operation 730, slave application process instance 220 waits to receive an ACK message from master application process instance 210 acknowledging the information associated with the descriptor ring sent at operation 728. If the ACK message is not received at an operation 732, then method 700 may proceed to operation 716 where the DISCONNNECT message is sent and the socket connection is disconnected at operation 750. If the ACK message is received at operation 732, then method 700 may proceed to an operation 734 where slave application process instance 220 determines if additional descriptor rings are to be generated for the shared memory interface. If so, then method 700 returns to operation 728 where the details of the next descriptor ring (e.g., second descriptor ring 236) are sent to master application process instance 210 in another ADD_RING message. If no further descriptor rings are needed, then method 700 proceeds to an operation 736 where a CONNECT message is sent to master application process instance 210 to indicate that the shared memory interface is ready.

Next, at an operation 738, slave application process instance 220 waits to receive a CONNECTED message from master application process instance 210 establishing the secure shared memory interface between slave application process instance 220 and master application process instance 210. If the CONNECTED message is not received at an operation 740, then method 700 may proceed to operation 716 where the DISCONNNECT message is sent and the socket connection is disconnected at operation 750. If the CONNECTED message is received at operation 740, then method 700 may proceed to an operation 742 where the shared memory interface, for example, shared memory interface 230, may be brought up to allow for the exchange of information between master application process instance 210 and slave application process instance 220. Details of exchanging information between master application process instance 210 and slave application process instance 220 using shared memory interface 230 will be further described in detail below in reference to FIG. 8.

Additionally, if the shared memory interface had been established prior to disconnecting the socket connection at operation 750, at an operation 752, slave application process instance 220 may also free the shared memory allocation and perform assorted cleanup operations.

Figure 8:
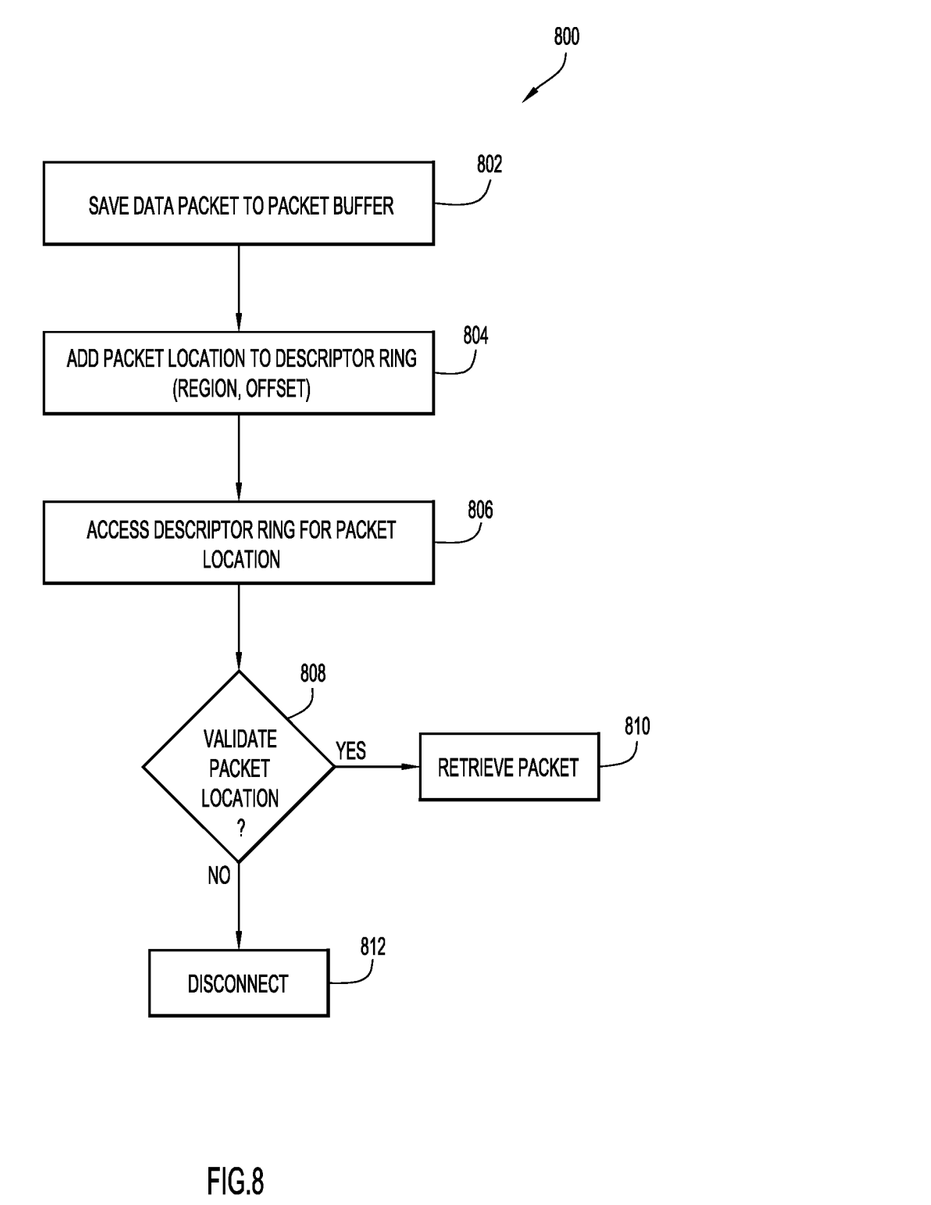
FIG. 8 is a flowchart of a method for exchanging information between master and slave application process instances, according to an example embodiment.

FIG. 8 is a flowchart of a method 800 for exchanging information between master application process instance 210 and slave application process instance 220, according to an example embodiment. In this embodiment, the information exchanged is one or more data packets that may be shared between the application process instances using shared memory interface 230. Method 800 may begin at an operation 802 where at least one data packet is saved to a packet buffer. For example, the data packet may be saved to packet buffer 238 in first shared memory region 232 of shared memory interface 230 as shown in FIG. 3.

Next, at an operation 804, the location of the data packet in the packet buffer is added to the appropriate descriptor ring. For example, in the case where slave application process instance 220 saves a data packet to packet buffer 238 in first shared memory region 232, slave application process instance 220 will add the location of the packet to first descriptor ring 234. In the reverse case, where master application process instance 210 saves a data packet to packet buffer 238, master application process instance 210 will add the location of the packet to second descriptor ring 236.

As described above, each descriptor ring provides unidirectional communication between application process instances. In the example embodiments, first descriptor ring 234 provides unidirectional communication from slave application process instance 220 to master application process instance 210 and second descriptor ring 236 provides unidirectional communication from master application process instance 210 to slave application process instance 220. With this arrangement, non-blocking access to shared memory interface 230 can be provided.

In this embodiment, the location of the data packet added to the descriptor ring is referenced by at least a region and an offset. The region identifies the region index of the shared memory interface, for example, shared memory interface 230 shown in FIG. 3 includes first shared memory region 232 identified by region index=0, second shared memory region 240 identified by region index=1, and third shared memory region 242 identified by region index=2. The offset identifies the start of the entry in the packet buffer in the particular shared memory region.

In an example embodiment, each descriptor ring (e.g., descriptor rings 234, 236) may contain a header and an array of buffer descriptors. The buffer descriptor is a 32-byte data structure that contains at least the following: flags (2 bytes)—space provided for various flags, which may be used for buffer chaining; region_index (2 bytes)—shared memory region where the buffer is located; offset (8 bytes)—the buffer start offset in the particular shared memory region; buffer length (4 bytes)—length of the buffer; length (4 bytes)—length of actual data in the buffer; metadata (8 bytes)—custom use space; reserved (4 bytes)—space provided for future use.

At an operation 806, an application process instance can access the region and offset information provided in the appropriate descriptor ring (e.g., master application process instance 210 accesses first descriptor ring 234) to retrieve the location of the data packet in the packet buffer. At an operation 808, master application process instance 210 may additionally validate the packet location prior to accessing the packet buffer to retrieve the data packet. The process of validating the data packet location will described further below with reference to FIG. 9.

If the result of the validation of the packet location at operation 808 is successful, then at an operation 810, the data packet is retrieved from the packet buffer at the location (i.e., region and offset) provided in the descriptor ring. If, however, the result of the validation of the packet location at operation 808 is not successful, then at an operation 812, master application process instance 210 can disconnect the connection with slave application process instance 220.

In the example embodiments, the shared memory data structures (e.g., descriptor rings 234, 236 and shared memory regions 232, 240, 242) are pointer-free. This pointer-free configuration protects application process instances in the case where the shared memory interface is corrupted. For example, a shared memory interface that uses pointers may direct an application process instance to a location that is either invalid or potentially malicious. Moreover, validating the location of the pointer in such a shared memory interface may be difficult. Thus, if a master application instance attempts to read a pointer to an invalid or malicious location, the master application instance may crash or become corrupted. The principles of the present embodiments described herein provide a shared memory interface architecture that protects the master application process instance from a misbehaving slave application process instance and provides a mechanism to validate the location of data in the shared memory interface prior to accessing the data.

Figure 9:
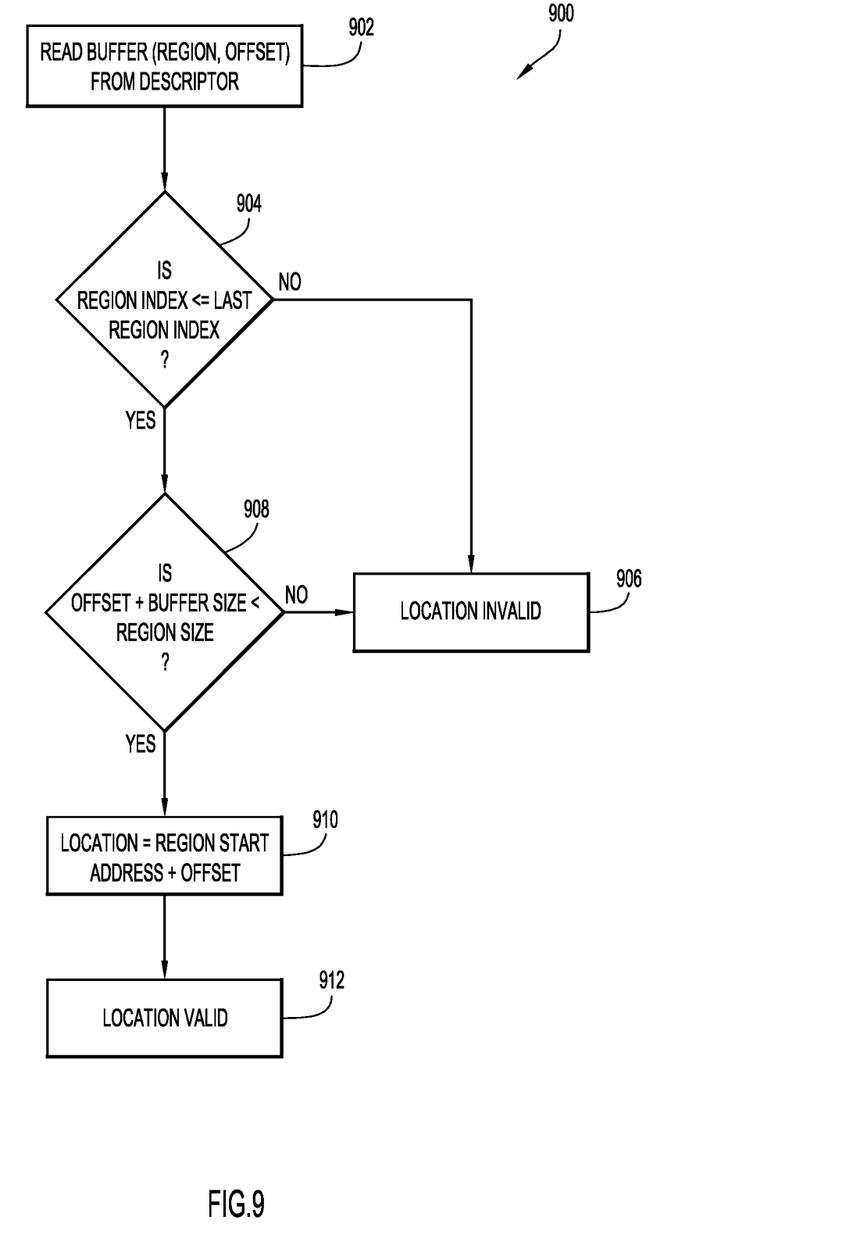
FIG. 9 is a flowchart of a method for validating a location of a packet stored in memory, according to an example embodiment.

Referring now to FIG. 9, a flowchart of a method 900 for validating a location of a data packet stored in shared memory interface 230 is shown according to an example embodiment. For example, method 900 may be performed at operation 808, described above. In this embodiment, method 900 may begin at an operation 902 where master application process 210 reads the location of the data packet provided in the descriptor ring (e.g., region and offset provided in first descriptor ring 234).

Next, at an operation 904, master application process 210 determines whether the region identified in the descriptor ring is valid by checking if the region index is less than or equal to the last region index of the one or more shared memory regions of the shared memory interface. For example, in the example embodiments, shared memory interface 230 includes first shared memory region 232 identified by region index=0, second shared memory region 240 identified by region index=1, and third shared memory region 242 identified by region index=2. Thus, in this example, at operation 904, master application process 210 determines whether the provided region in the descriptor ring is less than or equal to 2, i.e., the region index of third shared memory region 242 of shared memory interface 230. In other embodiments, if shared memory interface 230 includes additional shared memory regions, then the region index of the last shared memory region is used at operation 904.

At operation 904, if the region provided in the descriptor ring is greater than the last region index, then method 900 proceeds to an operation 906 where the location is determined to be invalid. In other words, if the location provided in the descriptor ring indicates a region index that is greater than the last region index of a shared memory region allocated to the shared memory interface, then master application process instance 210 can identify that the location is invalid prior to attempting to access the location. With this arrangement, master application process instance 210 may be protected from a corrupted slave application process instance 220.

At operation 904, if the region provided in the descriptor ring is less than or equal to the last region index, then method 900 proceeds to an operation 908. At operation 908, the offset portion of the location of the data packet provided in the descriptor ring is validated. The offset is validated at operation 908 by determining whether the offset plus the buffer size (i.e., the size of the data packet) is less than the region size. If the size is greater than the region size at operation 908, then method 900 proceeds to operation 906 where the location is determined to be invalid. For example, the size of the data packet in packet buffer 238 added to the identified offset cannot be larger than the size of the shared memory region.

At operation 908, if the size of the offset plus the buffer size is less than the region size, then method 900 proceeds to an operation 910 where the location is determined to be equal to the region and offset provided in the descriptor ring and is confirmed as valid at an operation 912.

Method 900 may repeat as needed for additional data packets and/or locations (region, offset) provided in the descriptor rings. In the event that a location is determined to be invalid at operation 906, master application process instance 210 may disconnect the connection with slave application process instance 220. With this configuration, a secure shared memory interface may be provided that protects a master application process instance from a misbehaving or corrupted slave application process instance.

The example embodiments provide a shared memory interface than can be used for Internet Protocol (IP) packet or Ethernet frame communication between two application process instances running in a user-space on a computer.

The principles of the example embodiments described herein can provide a secure shared memory interface to allow for the exchange of information between multiple application process instances. In addition, the shared memory interface is container friendly, i.e., no privileged containers are needed. For example, consider a container use case where two sides of an interface may have different privilege models. One side may be a virtual switch that controls physical interfaces and provides connectivity to multiple container applications. In some cases, the container applications may be controlled by different users. In accordance with the example embodiments, a secure shared memory interface can be configured to prevent a misbehaving container application from causing damage to the virtual switch, for example, due to a software defect or malicious action.

Compared to typical shared memory solutions where the whole shared memory has file system representation which is mapped to a container and can be accessed by a privileged user in the container, the shared memory interface of the example embodiments only becomes available after control channel negotiation (including optional shared secret verification) is complete.

The example embodiments provide a shared memory interface that provides support for multi-queue operation and allows lockless operation with multicore dataplane implementations. Each queue can operate in polling or interrupt mode operation. Interrupts may be simulated with event file descriptors (eventfd) infrastructure and support for interrupt masking is available in polling mode to prevent unnecessary system calls.

The principles of the example embodiments described herein can provide support for multiple queues, including asymmetric configurations, and can also support jumbo frames (chained buffers).

Additionally, the principles of the example embodiments described herein provide a master-slave relationship between application processes where the master application process instance is secure and does not share any resources with the slave application process instance. The slave application process instance allocates and initializes the shared memory regions after successful control channel negotiation/authorization.

The example embodiments describe a packet-based shared memory interface for user-mode applications with focus on security, reliability, support for containers, and scalability in multi-CPU core deployments.

In summary, a computer-implemented method is provided comprising: initiating a shared memory interface between a master application process instance and a slave application process instance running on a computer; allocating one or more regions to the shared memory interface, the one or more regions being disposed within a memory allocation of the slave application process instance; generating a first descriptor ring associated with unidirectional communication from the slave application process instance to the master application process instance in each region of the one or more regions of the shared memory interface; generating a second descriptor ring associated with unidirectional communication from the master application process instance to the slave application process instance in each region of the one or more regions of the shared memory interface; and exchanging information between the master application process instance and the slave application process instance by adding one or more packets to at least one region of the one or more regions of the shared memory interface.

In addition, a non-transitory computer readable storage media encoded with instructions is provided that, when executed by a processor, cause the processor to perform operations comprising: initiating a shared memory interface between a master application process instance and a slave application process instance running on a computer; allocating one or more regions to the shared memory interface, the one or more regions being disposed within a memory allocation of the slave application process instance; generating a first descriptor ring associated with unidirectional communication from the slave application process instance to the master application process instance in each region of the one or more regions of the shared memory interface; generating a second descriptor ring associated with unidirectional communication from the master application process instance to the slave application process instance in each region of the one or more regions of the shared memory interface; and exchanging information between the master application process instance and the slave application process instance by adding one or more packets to at least one region of the one or more regions of the shared memory interface.

Furthermore, an apparatus is provided comprising: a memory; and a processor coupled to the memory and configured to: initiate a shared memory interface between a master application process instance and a slave application process instance running on the memory; allocate one or more regions to the shared memory interface, the one or more regions being disposed within a memory allocation of the slave application process instance; generate a first descriptor ring associated with unidirectional communication from the slave application process instance to the master application process instance in each region of the one or more regions of the shared memory interface; generate a second descriptor ring associated with unidirectional communication from the master application process instance to the slave application process instance in each region of the one or more regions of the shared memory interface; and exchange information between the master application process instance and the slave application process instance by adding one or more packets to at least one region of the one or more regions of the shared memory interface.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
    initiating a shared memory interface between a master application process instance and a slave application process instance running on a computer, wherein the master application process instance is allocated a private memory area distinct from a private memory area allocated to the slave application process instance;
    allocating one or more shared memory regions to the shared memory interface, the one or more shared memory regions being disposed within a memory area allocated to the slave application process instance, wherein the one or more shared memory regions are distinct from both the private memory area allocated to the slave application process instance and the private memory area allocated to the master application process instance;
    generating a first descriptor ring associated with unidirectional communication from the slave application process instance to the master application process instance in a first region of the one or more shared memory regions;
    generating a second descriptor ring associated with unidirectional communication from the master application process instance to the slave application process instance in the first region of the one or more shared memory regions; and
    exchanging information from the master application process instance to the slave application process instance via the second descriptor ring and exchanging information from the slave application process instance to the master application process instance via the first descriptor ring by adding one or more packets to a packet buffer of the first region of the one or more shared memory regions of the shared memory interface, wherein the information is accessed by the master application process instance at the shared memory interface outside of the private memory area allocated to the master application process instance.

2. The method of claim 1, wherein initiating the shared memory interface further comprises establishing a secure connection between the master application process instance and the slave application process instance.

3. The method of claim 2, wherein establishing the secure connection includes:
    detecting, by the master application process instance, a socket connection by the slave application process instance;
    sending, by the master application process instance, an initialization message to the slave application process instance; and
    receiving, by the master application process instance, a response to the initialization message from the slave application process instance.

4. The method of claim 3, wherein the computer includes at least a kernel space and a user space; wherein the master application process instance and the slave application process instance are running in the user space; wherein the socket connection is made in the kernel space; and wherein the initialization message and the response are communicated between the master application process instance and the slave application process instance through the socket connection.

5. The method of claim 1,
wherein exchanging information between the master application process instance and the slave application process instance further comprises:
  saving, by the slave application process instance, at least one packet to the packet buffer of the first region of the shared memory disposed within the memory area allocated to the slave application process instance;
  adding, by the slave application process instance, an entry in the first descriptor ring that references a location of the at least one packet in the packet buffer by at least a region index and an offset; and
  accessing, by the master application process instance, the at least one packet in the packet buffer of the first region by reading the location from the first descriptor ring.

6. The method of claim 5, wherein accessing the at least one packet by the master application process instance further comprises validating the location in the first descriptor ring.

7. The method of claim 6, wherein validating the location includes determining that a size of the first region is larger than a sum of the offset associated with the at least one packet and a size of the at least one packet in the packet buffer.

8. The method of claim 7, wherein the master application process instance disconnects a socket connection with the slave application process instance upon determining that the location of the at least one packet provided by the slave application process instance is invalid.

9. A non-transitory computer readable storage media encoded with instructions that, when executed by a processor, cause the processor to perform operations comprising:
  initiating a shared memory interface between a master application process instance and a slave application process instance finning on a computer, wherein the master application process instance is allocated a private memory area distinct from a private memory area allocated to the slave application process instance;
  allocating one or more shared memory regions to the shared memory interface, the one or more shared memory regions being disposed within a memory area allocated to the slave application process instance, wherein the one or more shared memory regions are distinct from both the private memory area allocated to the slave application process instance and the private memory area allocated to the master application process instance;
  generating a first descriptor ring associated with unidirectional communication from the slave application process instance to the master application process instance in a first region of the one or more shared memory regions;
  generating a second descriptor ring associated with unidirectional communication from the master application process instance to the slave application process instance in the first region of the one or more shared memory regions; and
  exchanging information from the master application process instance to the slave application process instance via the second descriptor ring and exchanging information from the slave application process instance to the master application process instance via the first descriptor ring by adding one or more packets to a packet buffer of the first region of the one or more shared memory regions of the shared memory interface, wherein the information is accessed by the master application process instance at the shared memory interface outside of the private memory area allocated to the master application process instance.

10. The non-transitory computer readable storage media of claim 9, wherein initiating the shared memory interface further comprises establishing a secure connection between the master application process instance and the slave application process instance.

11. The non-transitory computer readable storage media of claim 10, wherein establishing the secure connection includes: detecting, by the master application process instance, a socket connection by the slave application process instance; sending, by the master application process instance, an initialization message to the slave application process instance; and receiving, by the master application process instance, a response to the initialization message from the slave application process instance.

12. The non-transitory computer readable storage media of claim 11, wherein the computer includes at least a kernel space and a user space; wherein the master application process instance and the slave application process instance are running in the user space; wherein the socket connection is made in the kernel space; and wherein the initialization message and the response are communicated between the master application process instance and the slave application process instance through the socket connection.

13. The non-transitory computer readable storage media of claim 9,
wherein exchanging information between the master application process instance and the slave application process instance further comprises:
  saving, by the slave application process instance, at least one packet to the packet buffer of the first region of the shared memory disposed within the memory area allocated to the slave application process instance;
  adding, by the slave application process instance, an entry in the first descriptor ring that references a location of the at least one packet in the packet buffer by at least a region index and an offset; and
  accessing, by the master application process instance, the at least one packet in the packet buffer of the first region by reading the location from the first descriptor ring.

14. The non-transitory computer readable storage media of claim 13, wherein accessing the at least one packet by the master application process instance further comprises validating the location in the first descriptor ring.

15. The non-transitory computer readable storage media of claim 14, wherein validating the location includes determining that a size of the first region is larger than a sum of the offset associated with the at least one packet and a size of the at least one packet in the packet buffer.

16. The non-transitory computer readable storage media of claim 15, wherein the master application process instance disconnects a socket connection with the slave application process instance upon determining that the location of the at least one packet provided by the slave application process instance is invalid.

17. An apparatus comprising:
  a memory;
  a processor coupled to the memory and configured to:
    initiate a shared memory interface between a master application process instance and a slave application process instance running on the memory, wherein the master application process instance is allocated a private memory area distinct from a private memory area allocated to the slave application process instance;

allocate one or more shared memory regions to the shared memory interface, the one or more shared memory regions being disposed within a memory area allocated to the slave application process instance, wherein the one or more shared memory regions are distinct from both the private memory area allocated to the slave application process instance and the private memory area allocated to the master application process instance;

generate a first descriptor ring associated with unidirectional communication from the slave application process instance to the master application process instance in a first region of the one or more shared memory regions;

generate a second descriptor ring associated with unidirectional communication from the master application process instance to the slave application process instance in the first region of the one or more shared memory regions; and exchange information from the master application process instance to the slave application process instance via the second descriptor ring and exchanging information from the slave application process instance to the master application process instance via the first descriptor ring by adding one or more packets to a packet buffer of the first region of the one or more shared memory regions of the shared memory interface, wherein the information is accessed by the master application process instance at the shared memory interface outside of the private memory area allocated to the master application process instance.

18. The apparatus of claim 17, wherein the processor is further configured to establish a secure connection between the master application process instance and the slave application process instance by:

detecting, by the master application process instance, a socket connection by the slave application process instance;

sending, by the master application process instance, an initialization message to the slave application process instance; and receiving, by the master application process instance, a response to the initialization message from the slave application process instance.

19. The apparatus of claim 18, wherein the memory includes at least a kernel space and a user space; wherein the master application process instance and the slave application process instance are running in the user space; wherein the socket connection is made in the kernel space; and wherein the initialization message and the response are communicated between the master application process instance and the slave application process instance through the socket connection.

20. The apparatus of claim 17, wherein the processor is configured to exchange information between the master application process instance and the slave application process instance by:

saving, by the slave application process instance, at least one packet to the packet buffer of the first region of the shared memory disposed within the memory area allocated to the slave application process instance;

adding, by the slave application process instance, an entry in the first descriptor ring that references a location of the at least one packet in the packet buffer by at least a region index and an offset; and accessing, by the master application process instance, the at least one packet in the packet buffer of the first region by reading the location from the first descriptor ring.

* * * * *

UNITED STATES PATENT AND TRADEMARK OFFICE
CERTIFICATE OF CORRECTION

PATENT NO. : 10,585,689 B1
APPLICATION NO. : 15/848713
DATED : March 10, 2020
INVENTOR(S) : Damjan Marion Page 1 of 1

It is certified that error appears in the above-identified patent and that said Letters Patent is hereby corrected as shown below:

In the Claims

Claim 9, Column 15, Line 36, please replace "instance finning on" with --instance running on--

Signed and Sealed this
Seventh Day of July, 2020

Andrei Iancu
*Director of the United States Patent and Trademark Office*